United States Patent Office 3,732,215
Patented May 8, 1973

3,732,215
IMIDAZOLE DERIVATIVES
Rudiger D. Haugwitz, Highland Park, and Venkatachala L. Narayanan,, Hightstown, N.J., assignors to E. R. Squibb & Sons, Inc., New York, N.Y.
No Drawing. Filed Feb. 8, 1971, Ser. No. 113,693
Int. Cl. C07d 93/06, 91/32
U.S. Cl. 260—243 R        10 Claims

ABSTRACT OF THE DISCLOSURE

Imidazole derivatives are provided having the structure

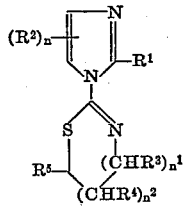

and which are useful as anthelmintic agents and anti-inflammatory agents.

---

The present invention relates to imidazole derivatives having the structure (I)

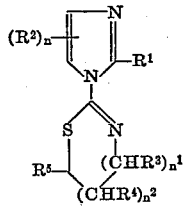

wherein $R^1$ is hydrogen, lower alkyl, aryl, aralkyl, sulfonic acid, ($-SO_3H$), alkanoic acid ($-(R^7)_{n3}COOH$ wherein $R^7$ is alkylene containing from 1 to about 6 carbon atoms and $n^3$ is 0 or 1), or halogen, $R^2$ is hydrogen, lower alkyl, aryl, aralkyl, lower alkylaryl, nitro, halogen, cyano, sulfonic acid ($-SO_3H$), alkanoic acid ($-(R^7)_n{}^3COOH$), alkyloxy- or aryloxycarbonyl

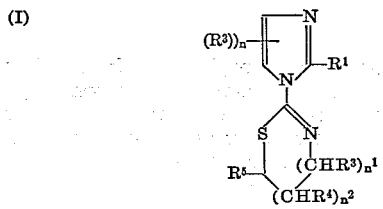

wherein $R^6$ and $R^{6\prime}$ are the same or different and can be lower alkyl, aryl or aralkyl; $R^3$, $R^4$ and $R^5$ are the same or different and can be hydrogen, lower alkyl, lower alkylaryl or halogen; $n$ is 1 or 2, $n^1$ is 0 or 1 and $n^2$ is 0 or 1 the sum of $n^1$ and $n^2$ being either 1 or 2.

The lower alkyl groups represented by the above R groups include straight or branched chain aliphatic hydrocarbon radicals having up to seven carbon atoms, such as methyl, ethyl, propyl, isopropyl, butyl, isobutyl, t-butyl, amyl, hexyl, heptyl, and the like. The lower alkyl groups can include as substituents any of the aryl groups mentioned below.

The alkylene group represents a divalent group corresponding to the above alkyl groups.

The alkoxy portion of the alkoxycarbonyl group includes straight and branched chain radicals of up to seven carbon atoms, corresponding to the above alkyl groups, e.g., methoxy, ethoxy, propoxy, isopropoxy, and the like. The aryloxy portion of the aryloxycarbonyl group includes any of the aryl groups set out below.

The term halogen includes each of the four halogens, but fluorine and chlorine are preferred.

The substituted amido groups include mono- or di- lower alkyl- or arylamido wherein lower alkyl and aryl are as defined herein, such as methylamido, ethylamido, isopropylamido, heptylamido, dimethylamido, diethylamido, ethylmethylamido, butylmethylamido, ethyl i-propylamido, phenylamido, diphenylamido, naphthylamido, or N-methyl-N-phenylamido and the like.

The term "aryl" includes monocyclic or bicyclic monovalent aromatic ring systems such as phenyl or naphthyl. These aryl radicals can include as substituents halogen, nitro or any of the alkyl groups mentioned hereinbefore.

Preferred are those compounds wherein $R^1$, $R^3$, $R^5$ are hydrogen, $R^2$ is phenyl, $n$ is 1, $n^1$ is 1 and $n^2$ is 0.

Examples of compounds falling within the present invention include the following:

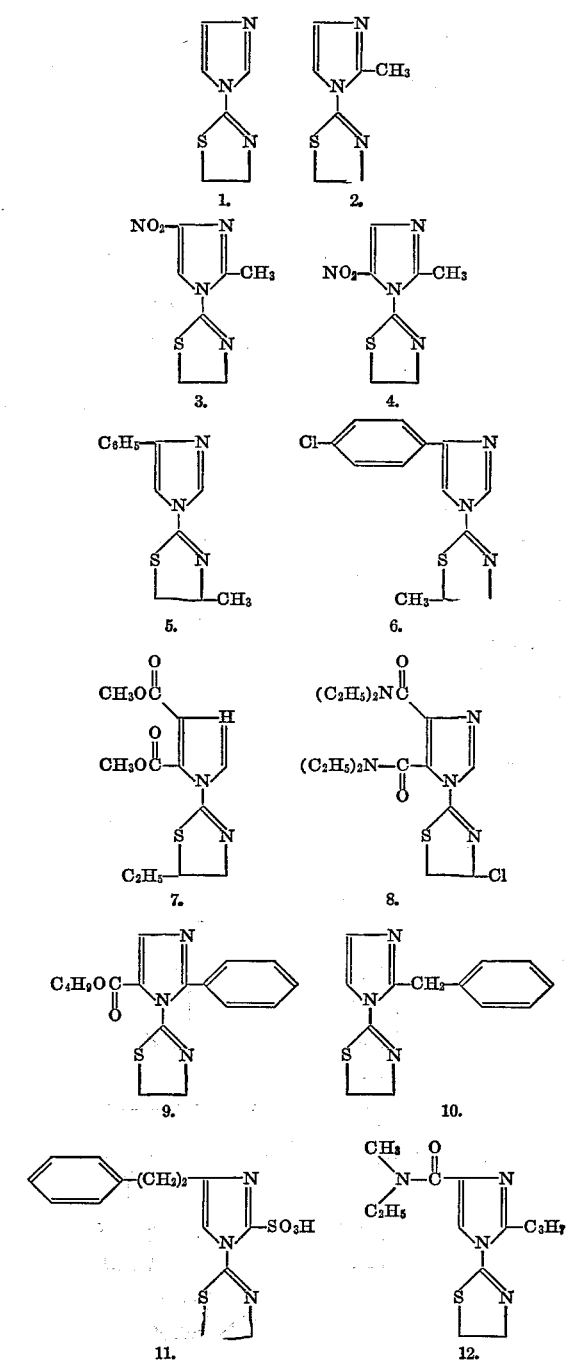

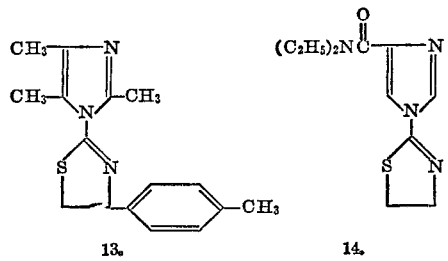
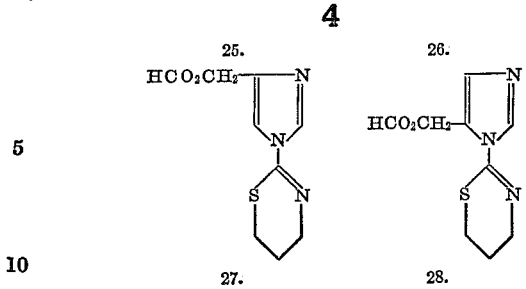
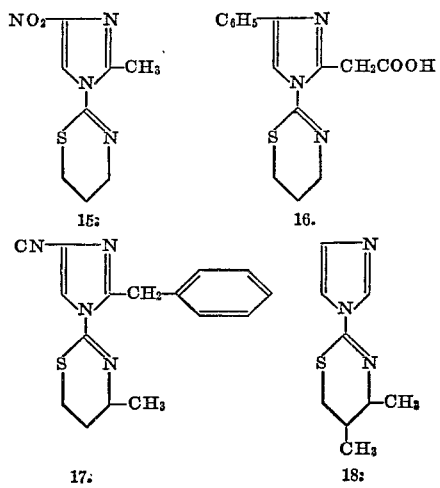
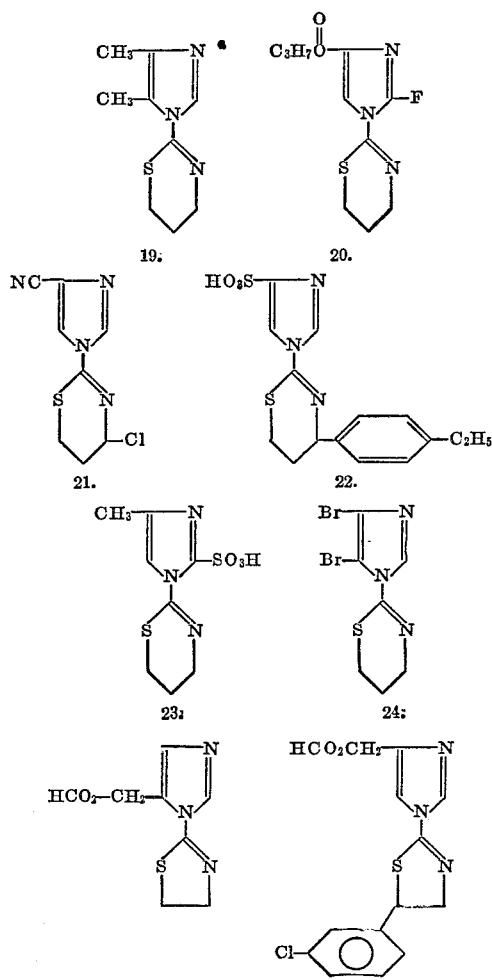

Compounds of Formula I can be prepared by first converting the imidazole (II) into its salt (III) by employing metal hydrides such as sodium hydride, Na/liquid ammonia or alkali metal alkoxides, such as sodium methoxide, potassium ethoxide or sodium butoxide.

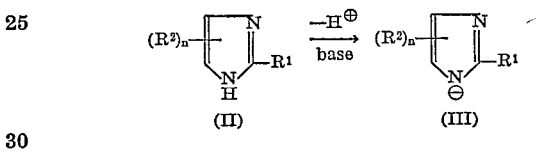

The above reaction can be brought about in a variety of aprotic solvents such as aromatic hydrocarbons, e.g., benzene, toluene or xylene or ethers such as ethylether or glyme, at temperature ranging from about 0° to about 150° for periods of about one hour to twenty-four hours. A slight excess of the base is desirable; thus the ratio of imidazole II to base can range from about 1:1 to about 1:2.

The salt (III) is reacted with an aliphatic haloalkylisothiocyanate (IV) to yield the novel imidazoles (I).

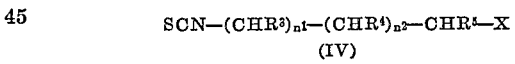

wherein X is Cl or Br.

The ratio of imidazole to haloalkylisothiocyanate can range from 1:1 to 1:3. The reaction time can vary from about 1 to about 10 hours at temperatures from about 35° to about 150°.

The preparation of a variety of imidazoles is well documented in Weissberger's, "The Chemistry of Heterocyclic Compounds, Imidazole and its Derivatives," Interscience Publishers, Co., New York, 1953.

Haloalkylisothiocyanates (IV) are readily synthesized from their corresponding haloalkyl amines (VII) and thiophosgene:

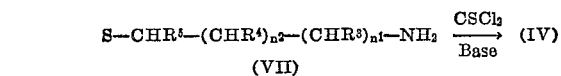

Additional routes toward compounds of structure (IV) are described in Houben-Weyl's "Methoden der Organischen Chemie," vol. 9, G. Thieme Verlag Stuttgart, 1955.

It is to be understood that imidazole containing a free imino hydrogen are virtually tautomeric systems and react like tautomeric mixtures of the two possible forms. Their reaction products namely the compounds of Formula I of the invention are not necessarily obtained in equal parts but in proportions which differ from compound to compound.

Thus, as an example 4 (or 5)-methyl-imidazole exists as tautomers A and B (below) and upon reaction will lead to products C and D (below).

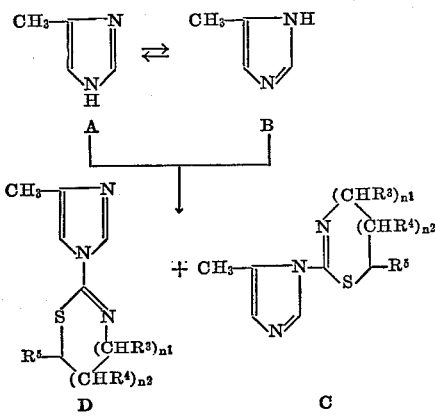

Examples of imidazole starting material II which can be employed herein include the following:

TABLE A $(R^2)_n$—imidazole—$R^1$ (N-H)

| | $R^2$ | $n$ | $R^1$ |
|---|---|---|---|
| 1 | 4-NO$_2$ | 1 | H |
| 2 | 4,5-di-C$_6$H$_5$ | 2 | Cl |
| 3 | 5-C$_6$H$_5$CH$_2$ | 1 | C$_6$H$_5$ |
| 4 | 4,5-di—CH$_2$—C$_6$H$_4$— | 2 | C$_6$H$_5$CH$_2$— |
| 5 | 5-C$_4$H$_9$—O—C(O) | 1 | CH$_2$COOH |
| 6 | 4-CH$_3$, CH$_3$\N—C(O) | 1 | C$_6$H$_5$C$_2$H$_4$— |
| 7 | 5-NO$_2$ | 1 | SO$_3$H |
| 8 | H | — | C$_6$H$_{13}$ |
| 9 | 4-SO$_3$H | 1 | CH$_3$ |
| 10 | 5-CN | 1 | F |
| 11 | 4-C$_2$H$_4$-COOH | 1 | Br |
| 12 | 4,5-di-F | 2 | H |
| 13 | 5-Cl | 1 | Cl |
| 14 | 5-SO$_3$H | 1 | —C$_3$H$_6$COOH |

Examples of aliphatic haloalkylisothiocyanates which can be employed herein include the following:

TABLE B

SCN-(CHR$^3$)$_{n'}^1$-(CHR$^4$)$_{n'}^2$-CHR$^5$-X

| | R$^3$ | $n'$ | R$^4$ | $n^2$ | R$^5$ | X |
|---|---|---|---|---|---|---|
| 1 | H | 1 | — | 0 | H | Cl |
| 2 | H | 1 | CH$_3$ | 1 | H | B |
| 3 | — | 0 | C$_2$H$_5$—C$_6$H$_5$ | 1 | H | Br |
| 4 | CH$_3$ | 1 | CH$_3$ | 1 | H | Cl |
| 5 | H | 1 | H | 1 | H | Br |
| 6 | C$_2$H$_5$ | 1 | C$_2$H$_5$ | 1 | Cl | Cl |

The compounds of Formula I form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic acid. Illustrative are the hydrohalides, especially the hydrochloride and hydrobromide which are preferred, sulfate, nitrate, phosphate, oxalate, tartrate, maleate, fumarate, citrate, succinate, methanesulfonate, benzenesulfonate, toluenesulfonate, and the like.

The imidazoles described herein have anthelmintic activity and are useful in the treatment and/or prevention of helminthiasis, a parasitic disease which causes widespread and often serious infection in domesticated animals such as swine, horses, cattle, sheep and goats. In treating domesticated animals, the compounds may be mixed with a nontoxic, edible carrier to form a feed supplement which is then incorporated in the animal feed in the desired concentration, or they may be administered in unit dosage forms which, in the case of large domesticated animals, take the form of boluses, or in the form of a liquid drench. Alternatively, water-soluble salts or a dispersable, wettable powder containing the anthelmintic agent may be added to the drinking water of the animals.

The preferred dosage level for treating a helminth infection will depend to a large extent on the particular imidazole compound being employed, on the severity of the infection and on the particular species of animal to be treated. In general, the imidazoles exhibit anthelmintic activity when administered to animals in a daily dose of about 50 to about 300 mg. per kilogram of animal body weight. It is preferred to employ in the range of 100–200 mg. per kilogram of body weight per day. The compounds may be given in a single dose or divided into a plurality of smaller doses. If desired, the course of treatment may be extended over a period of days in which case the optimum daily dose level may be lowered. When the compounds are to be employed primarily as prophylactic agents for the prevention of helminthic infections, the preferred daily dose level is, of course, lower than the therapeutic level is, preferably in the range of about 10–70 mg. per kilogram of body weight. The imidazoles may be incorporated in the animal feeds, and this method of administration is preferred when the compounds are to be used prophylactically, in which case they are incorporated in the feeds at concentrations such that the animal will consume daily from about 10 to about 70 mg. of imidazole per kilogram of body weight.

The means employed for administering these imidazoles to animals are not critical, and any of the methods now used or available for treating animals infected with or susceptible to parasitic infections are satisfactory. When these substances are employed therapeutically to treat an established infection, they are conveniently administered in a unit dosage form such as in a capsule, bolus, tablet, or as a liquid drench. It will be noted that all of these methods contemplate oral administration, since this is the most effective method of treating the worm-infested stomach or intestinal tract.

When the imidazoles are to be administered in unit dosage form, capsules, boluses or drenches containing the desired amount of anthelmintic distributed in a pharmaceutically acceptable vehicle are usually employed. These are prepared by intimately and uniformly mixing the active ingredient with suitable finely divided diluents, suspending agents, fillers, disintegrating agents and/or binders such as starch, lactose, talc, magnesium stearate, vegetable gums and the like. These unit dosage formulations may be widely varied with respect to their total weight and content of anthelmintic agent, depending on factors such as the type of host animal to be treated, the dose level desired, and the severity and type of parasitic infestation. For large animals such as sheep, swine or cattle, boluses weighing up to 15 grams may be used, although it is preferred to employ boluses weighing from 2–10 grams and containing from 1–5 grams of the anthelmintic agent. These boluses, as well as smaller size tablets, contain binders and lubricants, and are compounded by techniques known in this art. Capsules are readily prepared by mixing the active ingredient with a diluent such as starch or lactose and filling into the capsule.

In order to treat infected animals by means of a drench, the imidazoles are mixed with a suspending agent such as bentonite and the solid product added to water just prior to administration. The preferred drenches in accordance with this invention contain from about 5–50% by weight of imidazole compound.

The imidazoles described herein may also be administered as a component of the feed of the animals or dissolved or suspended in the drinking water. According to the invention, novel feed and feed supplement compositions are provided in which compounds of Formula I above are present as an active anthelmintic ingredient. Such compositions comprise the imidazoles intimately dispersed in or admixed with an inert carrier or diluent, i.e. one that is nonreactive with respect to the imidazole and that may administered with safety to the animals. The carrier or diluent is preferably one that is or may be an ingredient of the animal ration.

In the feed supplement compositions the active ingredient is present in relatively large amounts. These supplements are suitable for addition to the feed either directly or after an intermediate dilution or blending step. Examples of carriers or diluents suitable for such compositions are solid orally ingestible carriers such as distillers' dried grains, corn meal, citrus meal, fermentation residues, ground oyster shells, attapulgus clay, wheat shorts, molasses solubles, corn cob meal, edible vegetable substances, toasted dehulled soya flour, soybean mill feed, antibiotic mycelia, soya grits, crushed limestone and the like. The anthelmintic agents are intimately dispersed or admixed throughout the solid inert carrier by methds such as grinding, stirring, milling, or tumbling. By selecting proper diluents and by altering the ratio of carrier to active ingredient, compositions of any desired concentration may be prepared. Formulations containing from about 5% to about 50% by weight, and preferably from about 10–30% by weight, of active ingredient are particularly suitable for addition to feeds. The active compound is normally dispersed or mixed uniformly in the diluent but in some instances may be sorbed on the carrier.

Feed supplements are prepared by uniformly mixing the appropriate imidazole with the carrier or carriers. Such supplements are added to the finished animal feed in an amount adequate to give the final concentration desired for controlling or treating helminthiasis by way of the animal ration. Although the preferred level in feeds will depend on the particular compound being employed, the anthelmintic compounds of this invention are normally fed at levels of 0.10–2.0% in the feed. One advantageous method of administering the compounds of this invention to animals whose feeds are conveniently pelleted, such as sheep, is to incorporate them directly in the pellets. For instance, imidazole is readily incorporated in nutrionally adequate alfalfa pellets (during the pelleting operation) at levels of 0.5 to 5 grams per pound of pellets for therapeutic use, and at lower levels for prophylactic use, and such pellets fed to the worm-infested animals. Alternatively, the imidazoles may be incorporated in salt licks or salt blocks at any desired concentration (concentrations of 5–25% by weight are conveniently employed). Large animals such as sheep, cattle and goats, then receive the anthelmintics with their salt.

The imidazole derivatives of the invention are also useful an anti-inflammatory agents. They may be used to decrease joint swelling, tenderness, pain and stiffness in mammalian species, e.g., in conditions such as rheumatoid arthritis. Comounds of Formula I may be compounded for such use according to accepted pharmaceutical practice in oral dosage forms such as tablets, casules, elixirs or powders for administration of about 100 mg. to 2 gm. per day, preferably 100 mg. to 1 gm. per day in two to four divided doses.

The following examples further illustrate the invention:

EXAMPLE 1

1-(2-thiazolin-2-yl)imidazole

A solution of 7 g. of imidazole in 400 ml. of absolute ethyl ether is treated with 3 g. of sodium hydride and the mixture is stirred until the hydrogen evolution ceases (about 3 hours). To the slurry there is added 7.2 g. of $\beta$-chloroethylisothiocyanate dissolved in 10 mg. of ethyl ether, and the mixture is refluxed for 1 hour. The ether layer is decanted, the residue is washed twice with 200 ml. of ether, the combined ether fractions are evaporated to about 100 ml. of final volume and chilled to yield 4.5 g. of product. The mother liquor on further evaporation furnishes additional 3 g. of product, M.P. 74–78°.

*Analysis.*—Calcd. for $C_6H_7N_3S$ (percent): C, 47.07; H, 4.61; N, 27.43. Found (percent): C, 46.88; H, 4.83; N, 27.43.

EXAMPLE 2

4-(and/or 5-)phenyl-1-(2-thiazolin-2-yl)imidazole

A solution of 6.0 g. 4-phenylimidazole in 100 ml. of dry glyme is treated with 1.2 g. sodium hydride. After one hour of stirring at room temperature, 6 g. of $\beta$-chloroethylisothiocyanate is added and the mixture is stirred at 60° for one hour. The solvent is evaporated and to the residue there is added water. The solid is filtered off, dried and crystallized from ethyl ether to yield 5.2 g. of product, M.P. 125–128°.

*Analysis.*—Calcd. for $C_{12}H_{11}N_3S$ (percent): C, 62.87; H, 4.84; N, 18.33. Found (percent): C, 62.60; H, 4.90; N, 18.48.

EXAMPLE 3

4-(and/or 5-)nitro-1-(2-thiazolin-2-yl)imidazole

To a slurry of 1.5 g. of sodium hydride in 100 ml. of dry glyme there is added a mixture of 5.5 g. of 4-nitroimidazole in 150 ml. of dry glyme. After one hour of stirring at room temperature a solution of 6 g. of $\beta$-chloroethylisothiocyanate in 5 ml. of glyme is added and refluxed for 2.5 hours. After evaporation of the solvent, water is added to the residue. The solid is filtered off, dried and crystallized from benzene to yield 7 g. of product, M.P. 158–160°.

*Analysis.*—Calcd. for $C_6H_6N_4O_2S$ (percent): C, 36.36; H, 3.05; N, 28.7. Found (percent): C, 36.29; H, 3.06; N, 28.52.

EXAMPLE 4

5,6-dihydro-2-(4-(and/or 5-)nitro-1-imidazoyl)-4H-1,3-thiazine

To a mixture of 0.6 g. of sodium hydride and 20 ml. of dry glyme (1,2-dimethoxy ethane) there is added a slurry of 2.4 g. of 4-nitroimidazole and 60 ml. of dry glyme. After stirring the mixture for one hour at room temperature a solution of 3.9 g. of $\gamma$-bromopropylisothiocyanate in 10 ml. of glyme is added. This mixture is refluxed for 1.5 hours. The solvent is evaporated and water is added to the residue. The solid is filtered off, dried and crystallized from benzene to give 3 g. of the product, M.P. 118–120°.

*Analysis.*—Calcd. for $C_7H_8N_9O_3S$ (percent): C, 39.62; H, 3.80; N, 26.40; S, 15.11. Found (percent): C, 39.46; H, 3.76; N, 26.72; S, 15.09.

EXAMPLES 5 TO 20

In accordance with the procedure of the foregoing examples, substituting the imidazole shown in column 1 of Table I below and the aliphatic haloalkylisothiocyanate shown in column 2, the product shown in column 3 is obtained.

or 2; wherein the alkyl groups referred to as lower alkyl and the alkyl groups included as part of an alkyloxy, aralkyl or lower alkylaryl group contain up to 7 carbon atoms and wherein the aryl groups referred to as aryl and the aryl groups included as part of an aralkyl or lower alkylaryl group is a carbocyclic aryl or 6 to 10 carbon atoms.

TABLE I $$SCN-(CHR^3)_{n^1}-(CHR^4)_{n^2}-CHR^5-X$$

| Example No. | $R^1$ | $R^2$ | $n$ | $R^3$ | $n^1$ | $R^4$ | $n^2$ | $R^5$ | $X$ | $R^1$ | $R^2$ | $n^*$ | $R^3$ | $n^1$ | $R^4$ | $n^2$ | $R^5$ |
|---|---|---|---|---|---|---|---|---|---|---|---|---|---|---|---|---|---|
| 5 | H | 4-⟨⟩-Cl | 1 | H | 1 | ----- | 0 | H | Cl | Same as column 1. | Same as column 2. | | | | | | |
| 6 | $CH_3$ | $4-NO_2$ | 1 | H | 1 | ----- | 0 | $CH_3$ | Br | ---do--- | Do. | | | | | | |
| 7 | $CH_2C_6H_5$ | $4-CO_2H$ | 1 | H | 1 | ----- | 0 | H | Br | ---do--- | Do. | | | | | | |
| 8 | $C_3H_7$ | $5-SO_3H$ | 1 | $CH_3$ | 1 | ----- | 0 | Cl | Cl | ---do--- | Do. | | | | | | |
| 9 | $C_2H_5$ | 4-CN | 1 | $CH_2C_6H_5$ | 1 | ----- | 0 | H | Cl | ---do--- | Do. | | | | | | |
| 10 | $C_6H_5$ | $5-CO_2H$ | 1 | H | 1 | H | 1 | H | Cl | ---do--- | Do. | | | | | | |
| 11 | $CH_3$ | $5-CH_3O-\overset{O}{\underset{}{C}}$ | 1 | H | 1 | H | 1 | H | Cl | ---do--- | Do. | | | | | | |
| 12 | H | $5-(C_2H_5)_2N\overset{O}{\underset{}{C}}$ | 1 | H | 1 | $CH_3$ | 1 | Br | Br | ---do--- | Do. | | | | | | |
| 13 | $CH_3$ | $4,5-Di-CH_3$ | 2 | $CH_3$ | 1 | H | 1 | $CH_3$ | Cl | ---do--- | Do. | | | | | | |
| 14 | $C_4H_9$ | $4,5-Di-CO_2H$ | 2 | H | 1 | Cl | 1 | H | Cl | ---do--- | Do. | | | | | | |
| 15 | Br | $4-C_6H_5$ | 1 | $C_6H_5$ | 1 | H | 1 | H | Cl | ---do--- | Do. | | | | | | |
| 16 | I | H | 1 | H | 1 | H | 1 | H | Br | ---do--- | Do. | | | | | | |
| 17 | Br | $4,5-Di-Br$ | 2 | ----- | 0 | $C_6H_5$ | 1 | $C_2H_5$ | Cl | ---do--- | Do. | | | | | | |
| 18 | $-CH_2CO_2H$ | H | 1 | ----- | 0 | H | 1 | H | Cl | ---do--- | Do. | | | | | | |
| 19 | $CO_2H$ | $4-CH_3$ | 1 | ----- | 0 | H | 1 | H | Cl | ---do--- | Do. | | | | | | |
| 20 | $SO_3H$ | H | 1 | ----- | 0 | $CH_3$ | 1 | $C_6H_5$ | Cl | ---do--- | Do. | | | | | | |

* Where $n$ is 1, the $R^2$ is at the 4 and/or 5 position in the product (column 3) wherein $n$ is 2, the $R^2$'s are at the position indicated.

What is claimed is:

1. A compound of the structure

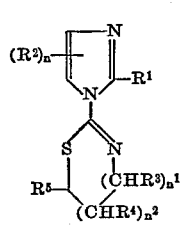

wherein $R^1$ is selected from the group consisting of hydrogen, lower alkyl, aryl, aralkyl, $-SO_3H$, $-(R^7)_{n^3}COOH$ wherein $R^7$ is alkylene containing from 1 to about 6 carbon atoms and $n^3$ is 0 or 2, or halogen, $R^2$ is selected from the group consisting of hydrogen, lower alkyl, aryl, aralkyl, lower alkylaryl, nitro, halogen, cyano, $-SO_3H$, $-(R^7)_{n^3}COOH$ wherein $R^7$ and $n^3$ are as previously defined, alkyloxy- or

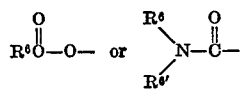

wherein $R^6$ and $R^{6'}$ are the same or different and are selected from the group consisting of lower alkyl, aryl or aralkyl; $R^3$, $R^4$ and $R^5$ are the same or different and are selected from the group consisting of hydrogen, lower alkyl, lower alkylaryl or halogen; $n$ is 1 or 2, $n^1$ is 0 or 1 and $n^2$ is 0 or 1, the sum of $n^1$ and $n^2$ being either 1

2. A compound as defined in claim 1 having the structure

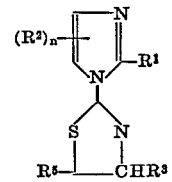

3. A compound as defined in claim 1 having the structure

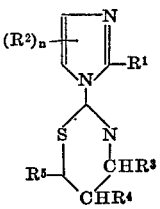

4. A compound as defined in claim 1 having the structure

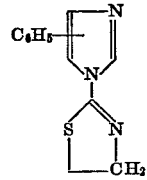

5. A compound as defined in claim 1 having the structure

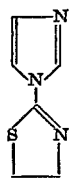

6. A compound as defined in claim 1 having the structure

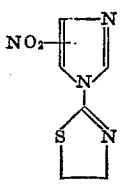

7. A compound as defined in claim 1 having the structure

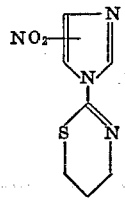

8. A compound as defined in claim 1 selected from the group consisting of 4-phenyl-1-(2-thiazolin-2-yl)imidazole and 5-phenyl-1-(2-thiazolin-2-yl)imidazole.

9. A compound as defined in claim 1 selected from the group consisting of 4-nitro-1-(2-thiazolin-2-yl)imidazole and 5-nitro-1-(2-thiazolin-2-yl)imidazole.

10. A compound as defined in claim 1 selected from the group consisting of 5,6-dihydro-2-(4-nitro-1-imidazolyl)-4H-1,3-thiazine and 5,6-dihydro-2-(5-nitro-1-imidazolyl)-4H-1,3-thiazine.

References Cited
UNITED STATES PATENTS
2,577,409  12/1951  Emerson et al. _____ 260—243
3,499,083  3/1970  Levitt _____ 260—243

JOHN M. FORD, Primary Examiner

U.S. Cl. X.R.
260—306.7; 424—246, 270

UNITED STATES PATENT OFFICE
CERTIFICATE OF CORRECTION

Patent No. 3,732,215        Dated May 8, 1973

Inventor(s) Rudiger D. Haugwitz and Venkatachala L. Narayanan

It is certified that error appears in the above-identified patent and that said Letters Patent are hereby corrected as shown below:

Column 1, line 30, formula (I), that portion of the formula reading:

Column 5, line 66, Table B, the term "n'" should be: -- $n^1$ --.

Column 8, line 73, the term "$C_7H_8N_9O_3S$" should be: -- $C_7H_8N_9O_2S$ --.

Column 9, claim 1, that portion of the sentence reading: "$n^3$ is 0 or 2, " should be: -- $n^3$ is 0 or 1, --.

Column 9, claim 1, that portion of the formula reading:

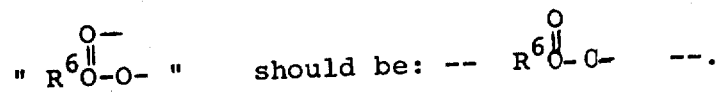

Signed and sealed this 22nd day of January 1974.

(SEAL)
Attest:

EDWARD M. FLETCHER, JR.         RENE D. TEGTMEYER
Attesting Officer                Acting Commissioner of Patents

UNITED STATES PATENT OFFICE
CERTIFICATE OF CORRECTION

Patent No. 3,732,215            Dated May 8, 1973

Inventor(s) Rudiger D. Haugwitz, et al

It is certified that error appears in the above-identified patent and that said Letters Patent are hereby corrected as shown below:

Column 9, claim 1, that portion of the formula reading:

$$R^6 \overset{O^-}{\underset{O-O-}{\|}} \quad \text{should be:} \quad -- \quad R^6 \overset{O}{\underset{O-C-}{\|}} \quad --.$$

This certificate supersedes Certificate of Correction issued January 22, 1974, with respect to column 9, claim 1, that portion of the formula shown.

Signed and sealed this 13th day of August 1974.

(SEAL)
Attest:

McCOY M. GIBSON, JR.            C. MARSHALL DANN
Attesting Officer                 Commissioner of Patents